United States Patent [19]

Schott

[11] Patent Number: 5,255,900
[45] Date of Patent: Oct. 26, 1993

[54] METHOD AND A DEVICE FOR PROCESSING HOT, LIQUID SLAGS

[75] Inventor: Hans-Klaus Schott, Dinslaken, Fed. Rep. of Germany

[73] Assignee: Kuettner GmbH & Co., K.G., Essen, Fed. Rep. of Germany

[21] Appl. No.: 724,719

[22] Filed: Jul. 2, 1991

[51] Int. Cl.⁵ .............................................. C04B 5/02
[52] U.S. Cl. ......................................... 266/44; 65/19; 65/141; 266/201
[58] Field of Search ................ 65/19, 20, 141; 266/44

[56] References Cited

FOREIGN PATENT DOCUMENTS 992453 1/1983 U.S.S.R. ............................... 65/141
2148330 5/1985 United Kingdom .................. 65/141

Primary Examiner—Melvyn J. Andrews
Attorney, Agent, or Firm—Kenyon & Kenyon

[57] ABSTRACT

A method for processing hot, liquid slag includes the steps of: conveying the slag to be processed to an upper region of a granular material forming a fluidized bed that has a temperature below the solidification temperature of the slag; cooling the slag to a temperature below its solidification temperature while simultaneously forming granules; and maintaining the temperature of the fluidized bed at a temperature below the solidification temperature of the slag.

54 Claims, 1 Drawing Sheet

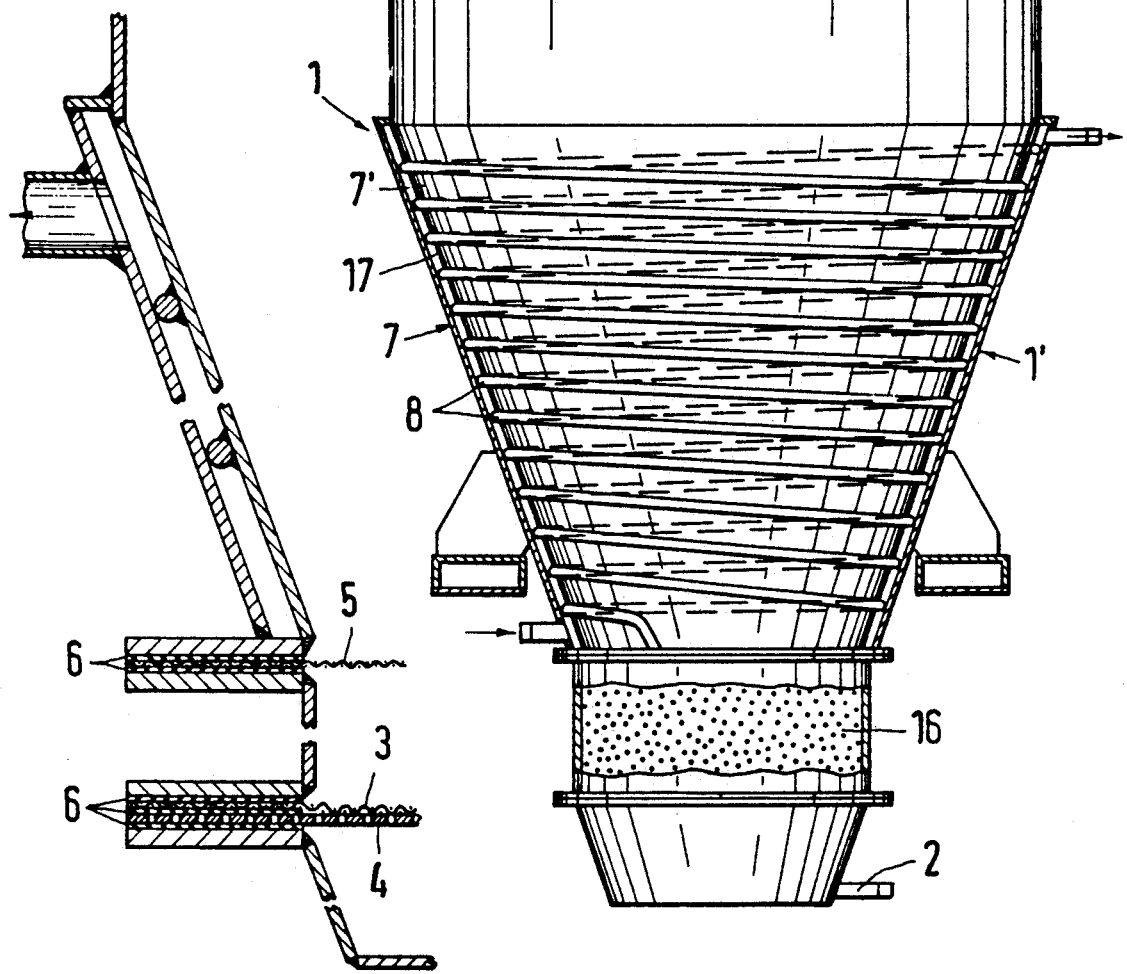
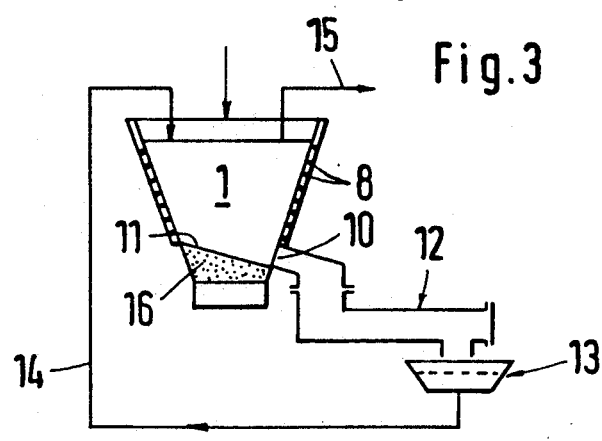

METHOD AND A DEVICE FOR PROCESSING HOT, LIQUID SLAGS

BACKGROUND OF THE INVENTION

The present invention relates generally to a method for processing of hot, liquid slags and more particularly to a method for processing of hot, liquid slags that occur in smelting furnaces (e.g., blast furnaces or cupola furnaces)

In such a method, the slags to be processed are fed with a grainy material into a fluidized bed for granulation (for use as a raw material). The temperature of the fluidized bed is below the solidification temperature of the slag, and thus it is cooled down to below its solidification temperature while simultaneously forming granules.

Industrially occurring slags are known to be mixtures of silicates, perhaps also sulfides, chlorides, fluorides and other metal compounds generated in a smelt flow, which contain gangue from metallurgical smelting processes as well as other undesirable constituents from the smelting process.

For example, in ferrous and non-ferrous metallurgy, or in blast furnace slags, the ores (e.g., $SiO_2$, CaO, MgO, $Al_2O_3$), the coke ash, and the smelting additives, result from the gangue. The slags are primarily silicates and have been added to pick up harmful components and impurities (primarily sulfur).

Additionally, during the purifying process so-called Thomas slags are generated. Also, in the Siemens-Martin process basic or acidic slags are encountered, as are found in the operation of electric arc furnaces. Other examples of processes that generate a continuous, considerable volume of slags are found in reduction and refining processes in non-ferrous metal extraction and in cast iron production. In a cupola furnace, slags are formed from the ash of the coke, the sand and soot adhering to batch material, and from the scale and additives.

Although slags in metallurgy and foundry engineering are in a strict sense a "waste product," it is by no means true that this "byproduct" is of no value. Rather, slags represent a quite valuable raw material for other uses (e.g., for cement or glass production). To be able to recover slags in a suitable manner, they need to be processed after they emerge in a hot, liquid condition. For example, the cement industry needs glass-like, solidified, amorphous slags, while the glass industry desires a crystalline solid. Both of these examples, as well as other application examples (e.g., in road building), require that the slags be processed after their generation in order to alter their structure.

In a known method the hot slags flowing out of a smelting unit are quenched in a water stream traveling at relatively high speed and are thus broken into granules. Although this method provides good raw material, a limitation of this method is that mechanical and/or environmental problems are encountered that cannot be readily solved. For example, water pollution is particularly problematic, and the highly corrosive vapors generated on a large scale during this wet quenching-granulation process are difficult to satisfactorily handle.

One disadvantage of the wet granulation process is that wet-processed slags have a limited storage life, since wet-stored slags tend to solidify after a certain time due to their hydraulic properties. Consequently, any further processing of wet-processed slags will require an energy-intensive drying process beforehand. Furthermore, the tangible heat of the slag cannot be recovered from a wet granulation process.

In spite of the considerable disadvantages enumerated above, the wet granulation process is still being practiced on a significant scale. The considerable disadvantages are either accepted or taken into account in order to manage at least to some degree the considerable slag volumes produced and to obtain a raw, granulated material that is recovered for further use.

The article by H. W. Gudenau, K. H. Lindner, H. Maas and K. H. Peters, "Recovery of Waste Heat from Slags", in the German language journal "Stahl und Eisen", 106 (1986) no. 23, pp. 1281-1286, discloses a method belonging to the type described above, and an apparatus to implement this method ("Merotec-Slag Granulating System;" see page 1282, right column, f. and FIG. 3). The fundamental idea of this granulation method is to cool the liquid slags quickly, not with water as before, but rather by injecting a fine-grained, cold, recycled material into a thin, liquid slag film.

For each ton of liquid slag (at a temperature of about 1300° C.) about one ton of material having a grain size less than 3 mm is injected, and a granulate at a temperature of about 600°-700° C. is produced which is sifted after cooling. When processing a blast furnace slag, 90 to 95% of the material is obtained in a granular range smaller than 5 mm.

Although this known method is clearly superior to wet granulation processes because the disadvantages enumerated above are largely avoided, it nevertheless still has considerable disadvantages. For example, the accelerator wheel which accelerates the fine-grained, cold slags into the hot, liquid slags, is subjected to severe wear. Additionally, wear also occurs on the agitators located in the fluidized bed.

In addition, it turns out that up to 86% of the slag end-product contains granules that are smaller than 3 mm, so that a granulate is obtained (with a glass content of about 80%) that cannot be used either in the cement industry nor in the production of insulating concrete and thermal-insulating building blocks since its density of 1.3 g/cm$^3$ yields too large a bulk weight. This fine granulate is unsuitable for antifreeze-layers and support layers in road construction.

In view of the prior art, there is a need for providing a method and apparatus for processing hot, liquid slag in which there is a significant reduction in the wear of the system components; in which the process can be performed on a continuous basis; and in which the slag granulate obtained has significantly better granulation with a considerable reduction in fines and very fine fractions so that the slag end-product can be used as a raw material for any one of many potential purposes. Moreover, the greatest possible heat recovery should be achieved, particularly through the generation of steam and/or hot water.

SUMMARY OF THE INVENTION

The present invention provides a method for processing hot, liquid slag that includes the steps of: conveying the slag to be processed to an upper region of a granular material forming a fluidized bed that has a temperature below the solidification temperature of the slag; cooling the slag to a temperature below its solidification temperature while simultaneously forming granules; and maintaining the temperature of the fluidized bed at a temperature below the solidification temperature of the slag.

It is advantageous if the liquid slag moving from the smelting system is conveyed onto the surface of the fluidized bed.

Surprisingly, as a result of this method, there will not be a plugging of the "pores" in the fluidized bed of the carrier material. Evidently, a fluidized bed is suitable for solving the existing cooling problem, in particular because of its excellent properties as a heat-exchanger. Apparently, the liquid slag introduced into the fluidized bed is broken down into smaller particles due to the motion of the granular carrier material. The slag then sinks through the carrier material to the base of the fluidized bed, whereupon the slag particles solidify as they cool. As a result of the equally shock-like cooling upon immersion of the slag into the fluidized bed, a significant thermal stress evidently occurs. Consequently, a large number of stress-related cracks and breaks are produced so that the desired granulation takes place in a particularly advantageous manner.

It has proven to be particularly useful if the apparent density of the carrier material forming the fluidized bed is less than the apparent density of the slag being processed so that for a specified apparent density of the slag the rate of sinking can be uniformly determined. If a relatively slow sinking of the slag is desired, then the apparent density of the carrier material should be chosen so that it is only slightly less than the apparent density of the slag.

Sand has proven to be a particularly useful and relatively low-cost carrier material; its apparent density of about 2.2 to 2.3 is somewhat less than the average, apparent density of slag (about 2.3 to 2.5). Hence, a particularly useful, economical mode of operation will result with the use of old foundry sand. Sand (or a similar carrier material) is far superior to the fine slag injected in the related method mentioned above, because it has a melting temperature of about 1950° C. which is considerably above the typical melting temperature of liquid, industrial slag, which is about 1200° to 1300° C. This property of the sand provides a great advantage when used in the method of the present invention, as will be readily apparent to one skilled in the art, because the pore structure of the fluidized bed can be maintained in those regions that initially come into contact with the hot, liquid slag.

If granular slag were used as the carrier material in the method described above, then evidently there would arise the potential danger that the carrier material would at least partially melt (smelting), consequently forming slag rams that result in disruptions of the operation.

According to another aspect of the invention, an apparatus is provided for processing hot, liquid slag that includes a coolable container. A granular carrier material at least partially fills the container and at least one gas source is in fluidic communication with the container to create a carrier material fluidized bed. The container has an outlet opening disposed at its lower end section for removing treated slag. A slag fill opening is disposed at an upper end section of the container for filling the container with the slag.

BRIEF DESCRIPTION OF THE DRAWINGS

FIG. 1 is a schematic illustration of a slag fluidized bed reactor;

FIG. 2 shows an enlarged, detailed cross section through the reactor of FIG. 1; and FIG. 3 is a schematic illustration of a slag processing system constructed according to the principles of the present invention.

DETAILED DESCRIPTION

FIG. 1 shows the essential portions of an apparatus for processing hot, liquid slag by means of dry granulation. An essentially funnel-like container (1) has a funnel-shaped portion filled essentially with a granular carrier material, which in the example illustrated is sand, and more particularly, old foundry sand.

The container (1) is connected to a compressed air source at inlet (2) to create a carrier material fluidized bed. As seen in FIG. 2, the lower section of container (1) has a perforated plate (4) lined with a sieve base (3). Another sieve base (5) is located in the upper flange region, where seals (6) ensure the necessary tightness. Between sieve base (5) and perforated plate (4) there is loose ball fill (16), which in the present example is formed by steel grit. This system can be used to adjust the resistance (e.g., pressure loss) that is required for the flow.

Mantle (7) of the double-wall container (1) is provided with dividable guide plates (8) for the water/steam flow chamber (17), so that the coolant is given a definite flow direction and no partial overheating of inner wall (7') can occur.

The liquid slag will be fed to container (1) from above, as illustrated in FIG. 1 by the arrow (9). The apparent density of the slag is about 2.4, which is somewhat greater than the apparent density of the carrier material, which is about 2.25. Consequently, the liquid slag fed onto the carrier material-fluidized bed is broken down into small particles due to the movement of the fluidized bed. Because of the coarser particles and the slightly differing apparent density compared to the carrier material, these particles slowly sink down to the bottom of the fluidized bed and then solidify upon cooling, so that the dry, granulated slag can be removed from container (1) through the removal opening (10). The illustration in FIG. 3 shows that level of the finished, granulated slag that has sunk down to the base (11) of container (1) departs from the horizontal. The slag is then fed to a sifter (13), possibly via an intermediate conveyor (12). The sifter sifts out the sand from the carrier material still adhering to the slag. This sand is the fed via a pneumatic conveyor line (14) back into container (1) via a pneumatic conveyor line (14).

The gases rising in container (1) will be removed in the direction of arrow (15) and fed to the gas purification apparatus of the smelter system from which the container (1) is charged with the liquid slag to be processed.

Since the processing (with exception of the enclosed cooling system) can take place without (open) water circulation, and moreover because the processing is essentially enclosed, an extremely non-polluting process may be attained with the present invention that can process industrial slags into valuable raw materials, the quality of which fully meets the requirements placed on them by the various consumers. Surprisingly, over the course of a longer operating period there will be no plugging of the carrier material, and consequently there is the possibility that the operation can be run continuously, whereby the dry granulation performed according to the invention can take place through shock-cooling in one or more steps. It is advantageous if the cooling power of the cooling device is controllable or adjustable, since the solidification temperature thus achieved can affect the structure of the slag to be processed. As a result, by using the same apparatus and the same method, end products having different material properties can be produced.

It should be noted that the container (1) or its outlet opening (10) may be provided with an outlet-connected crushing unit (e.g., a crusher) if a still smaller slag granulation than results from the method of the present invention is desired.

In addition, it should also be pointed out that in general, the mantle (7) of the double wall container (1) can be provided with an evaporative cooler instead of a water cooler. The container (1) can thus be operated at a differing pressure level since the evaporative cooler yields a differing steam temperature. Furthermore, a differing solidification temperature of the carrier material or of the fluidized bed will result. As a consequence, a precise, fine control can be achieved.

According to an alternative embodiment of the invention, at least one heat exchanger can be provided in the region of the fluidized bed to draw heat therefrom. Such a heat exchanger can operate as an "inverse immersion boiler". That is, it takes heat from the outside and heats the medium flowing in its interior, which is then fed preferably to a heat recovery unit along with the coolant for mantle cooling so that the heat absorbed by the coolant may be extracted and reused.

Alternatively, or perhaps in addition, according to another preferred design of the present invention, at least one heat exchanger can be provided in the region of the fluidized bed to pull heat from the fluidized bed, where one such heat exchanger can operate equally as an "inverse immersion boiler," that is, it takes heat from the outside and then heats the medium flowing in its interior, which then is fed preferably to a heat recovery unit, together with the coolant for mantle cooling, in order to extract the heat absorbed by the coolant and to reuse it.

I claim:

1. A method for processing hot, liquid slag comprising the steps of:
   conveying the slag to be processed to an upper region of a granular material forming a fluidized bed having a temperature below the solidification temperature of the slag;
   cooling the slag to a temperature below its solidification temperature while simultaneously forming granules; and
   maintaining the temperature of the fluidized bed at a temperature below the solidification temperature of the slags.

2. The method of claim 1 wherein the step of conveying the slag to be processed includes the step of conveying the slag to be processed to a surface of the fluidized bed.

3. The method of claim 1 wherein the granular material is a carrier material having an apparent density that is less than the apparent density of the slag being processed.

4. The method of claim 2 wherein the granular material is a carrier material having an apparent density that is less than the apparent density of the slag being processed.

5. The method of claim 3 wherein the apparent density of the carrier material is about 5 to 20% less than the apparent density of the slag.

6. The method of claim 3 wherein the carrier material consists essentially of sand.

7. The method of claim 5 wherein the carrier material consists essentially of sand.

8. The method of claim 6 wherein a portion of the sand of the carrier material is old foundry sand.

9. An apparatus for processing hot, liquid slag comprising: a coolable container; a granular carrier material at least partially filling said container; at least one gas source in fluidic communication with said container creating a carrier material fluidized bed, said container having an outlet opening disposed at a lower end section of said container for removing treated slag; and a slag fill opening disposed at an upper end section of said container for filling said container with the slag.

10. The apparatus of claim 9 wherein said container has a mantle that includes a cooling device.

11. The apparatus of claim 10 wherein said cooling device of said mantle includes a water cooling unit.

12. The apparatus of claim 10 wherein said mantle includes an evaporative cooler for evaporative cooling.

13. The apparatus of claim 12 wherein the evaporative cooling of said evaporative cooler is operable at a variable pressure level.

14. The apparatus of claim 9 further comprising at least one heat exchanger located in the vicinity of the fluidized bed, said heat exchanger being adapted to remove heat from said fluidized bed according to the inverse immersion boiler principle.

15. The apparatus of claim 10 further comprising at least one heat exchanger located in the vicinity of the fluidized bed, said heat exchanger being adapted to remove heat from said fluidized bed according to the inverse immersion boiler principle.

16. The apparatus of claim 11 further comprising at least one heat exchanger located in the vicinity of the fluidized bed, said heat exchanger being adapted to remove heat from said fluidized bed according to the inverse immersion boiler principle.

17. The apparatus of claim 13 further comprising at least one heat exchanger located in the vicinity of the fluidized bed, said heat exchanger being adapted to remove heat from said fluidized bed according to the inverse immersion boiler principle.

18. The apparatus of claim 9 wherein said cooling device has variable cooling power.

19. The apparatus of claim 10 wherein said cooling device has variable cooling power.

20. The apparatus of claim 11 wherein said cooling device has variable cooling power.

21. The apparatus of claim 14 wherein said cooling device has variable cooling power.

22. The apparatus of claim 9 wherein the carrier material comprises a material having a range of particle sizes.

23. The apparatus of claim 10 wherein the carrier material comprises a material having a range of particle sizes.

24. The apparatus of claim 12 wherein the carrier material comprises a material having a range of particle sizes.

25. The apparatus of claim 14 wherein the carrier material comprises a material having a range of particle sizes.

26. The apparatus of claim 18 wherein the carrier material comprises a material having a range of particle sizes.

27. The apparatus of claim 9 wherein said carrier material includes a majority of sand.

28. The apparatus of claim 11 wherein said carrier material includes a majority of sand.

29. The apparatus of claim 13 wherein said carrier material includes a majority of sand.

30. The apparatus of claim 15 wherein said carrier material includes a majority of sand.

31. The apparatus of claim 22 wherein said carrier material includes a majority of sand.

32. The apparatus of claim 27 wherein said carrier material includes old foundry sand.

33. The apparatus of claim 31 wherein said carrier material includes old foundry sand.

34. The apparatus of claim 9 wherein said gas source comprises a compressed air source.

35. The apparatus of claim 12 wherein said gas source comprises a compressed air source.

36. The apparatus of claim 32 wherein said gas source comprises a compressed air source.

37. The apparatus of claim 9 further comprising a crusher unit coupled to said outlet opening.

38. The apparatus of claim 34 further comprising a crusher unit coupled to said outlet opening.

39. The apparatus of claim 9 further comprising a sieve unit coupled to said container for separating carrier material adhering to the granulated slag from the slag.

40. The apparatus of claim 37 further comprising a sieve unit coupled to said container for separating carrier material adhering to the granulated slag from the slag.

41. The apparatus of claim 39 further comprising a conveyor unit coupled to said sieve unit for conveying sieved carrier material back into said container.

42. The apparatus of claim 41 wherein said conveyor unit is a pneumatic conveyor unit.

43. The apparatus of claim 9 further comprising an exhaust gas collection line disposed in the upper end section of said container, said gas collection line being coupled to a heat exchanger.

44. The apparatus of claim 14 further comprising an exhaust gas collection line disposed in the upper end section of said container, said gas collection line being coupled to a heat exchanger.

45. The apparatus of claim 42 further comprising an exhaust gas collection line disposed in the upper end section of said container, said gas collection line being coupled to a heat exchanger.

46. The apparatus of claim 43 wherein said exhaust gas collection line is coupled to a gas purification device of a smelting unit that supplies the slag to be processed.

47. The apparatus of claim 9 wherein said container has at least a two-stage configuration such that the outlet opening disposed in a first stage is coupled to the fill opening disposed in a second stage.

48. The apparatus of claim 46 wherein said container has at least a two-stage configuration such that the outlet opening disposed in a first stage is coupled to the fill opening disposed in a second stage.

49. The apparatus of claim 9 wherein said container has a container bottom disposed at an acute angle relative to the horizontal, a lowest portion of said container bottom being disposed nearest said outlet opening.

50. The apparatus of claim 46 wherein said container has a container bottom disposed at an acute angle relative to the horizontal, a lowest portion of said container bottom being disposed nearest said outlet opening.

51. The apparatus of claim 9 further comprising a heat recovery system removing heat that is withdrawn from the carrier material or the fluidized bed.

52. The apparatus of claim 48 further comprising a heat recovery system removing heat that is withdrawn from the carrier material or the fluidized bed.

53. The apparatus of claim 1 wherein said carrier material has a melting temperature above the melting temperature of the hot, liquid slag being processed.

54. The apparatus of claim 6 wherein said carrier material has a melting temperature above the melting temperature of the hot, liquid slag being processed.

* * * * *

UNITED STATES PATENT AND TRADEMARK OFFICE
CERTIFICATE OF CORRECTION

PATENT NO. : 5,255,900

DATED : October 26, 1993

INVENTOR(S) : Hans-Klaus Schott

It is certified that error appears in the above-identified patent and that said Letters Patent is hereby corrected as shown below:

On the title page, Item [54] Title of invention, and Column 1, lines 2-4 should read --METHOD AND APPARATUS FOR--.

Column 5, lines 32-42 delete entirely.
Column 8, line 36, change "apparatus" to --method--.
          line 39, change "apparatus" to --method--.

Signed and Sealed this

Second Day of August, 1994

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,255,900
DATED : October 26, 1993
INVENTOR(S) : Hans-Klaus Schott

It is certified that error appears in the above-indentified patent and that said Letters Patent is hereby corrected as shown below:

On title page, item [54] and col. 1, lines 2-4, change, "METHOD AND A DEVICE FOR PROCESSING HOT, LIQUID SLAGS" to —METHOD AND APPARATUS FOR PROCESSING HOT, LIQUID SLAGS—
Column 5, line 32-42 delete entirely.
Column 8, line 36, change "apparatus" to —method—
Column 8, line 39, change "apparatus" to —method—

This Certificate supersedes Certificate of Corrections issued August 2, 1994.

Signed and Sealed this

Thirty-first Day of January, 1995

Attest:

BRUCE LEHMAN

Attesting Officer                Commissioner of Patents and Trademarks